United States Patent
Park et al.

(10) Patent No.: US 9,226,093 B2
(45) Date of Patent: Dec. 29, 2015

(54) METHOD FOR GENERATING RECIPE INFORMATION IN MOBILE TERMINAL

(71) Applicant: LG ELECTRONICS INC., Seoul (KR)

(72) Inventors: Hyorim Park, Seoul (KR); Sangmin Lee, Seoul (KR); Boram Kim, Seoul (KR); Sungil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/254,078

(22) Filed: Apr. 16, 2014

(65) Prior Publication Data

US 2015/0119003 A1    Apr. 30, 2015

(30) Foreign Application Priority Data

Oct. 28, 2013    (KR) .................. 10-2013-0128720

(51) Int. Cl.
*H04W 4/00*    (2009.01)
(52) U.S. Cl.
CPC ...................... *H04W 4/00* (2013.01)
(58) Field of Classification Search
CPC ............................................. H04W 4/00
USPC ..................................... 455/414.1
See application file for complete search history.

(56) References Cited

U.S. PATENT DOCUMENTS

2011/0132201 A1*    6/2011    Richardson et al. ............ 99/325

FOREIGN PATENT DOCUMENTS

| JP | 2012-150604 A | 8/2012 |
| JP | 2013-213663 A | 10/2013 |
| JP | 2013-214194 A | 10/2013 |
| WO | WO 2013/096136 A1 | 6/2013 |

* cited by examiner

*Primary Examiner* — Christopher M Brandt
(74) *Attorney, Agent, or Firm* — Birch, Stewart, Kolasch & Birch, LLP

(57) ABSTRACT

A mobile terminal and a method for generating recipe information of the mobile terminal are disclosed, in which information useful for a user is generated by taking a picture and using externally collected data. The method for generating recipe information of a mobile terminal, which performs communication with at least one home appliance to generate recipe information comprises the steps of carrying out a function of generating recipe information on the basis of a user request; collecting operation data of the at least one home appliance driven in association with cooking; receiving a request for taking images received through a camera in a state that the function of generating recipe information is being carried out; and taking the images received through the camera in response to the request for taking images and processing the operation data collected from the at least one home appliance in association with the taken images.

21 Claims, 20 Drawing Sheets

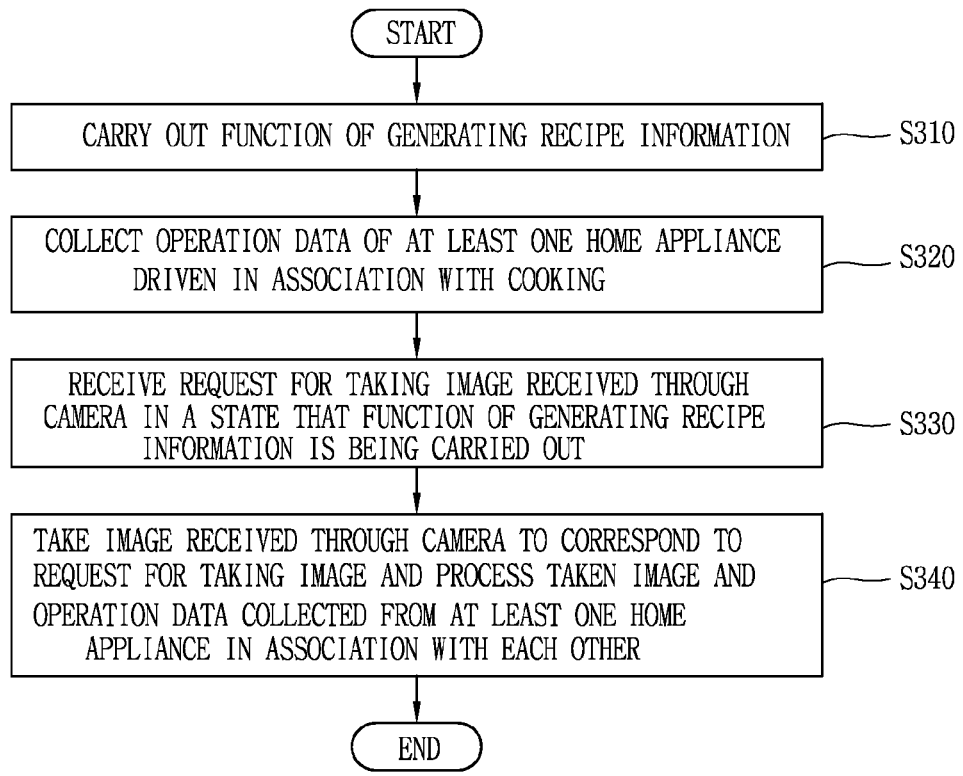

FIG. 5
(a)
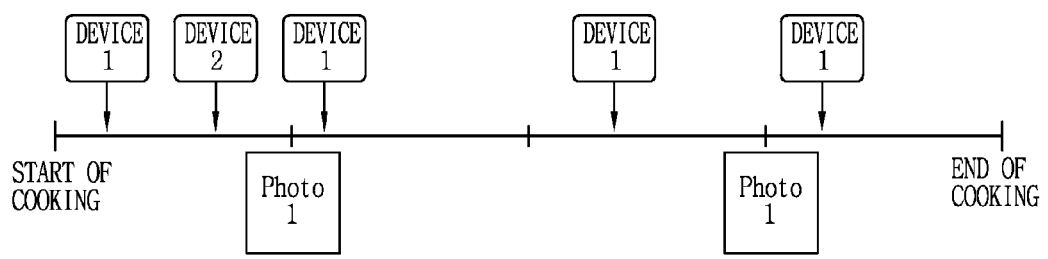
(b)
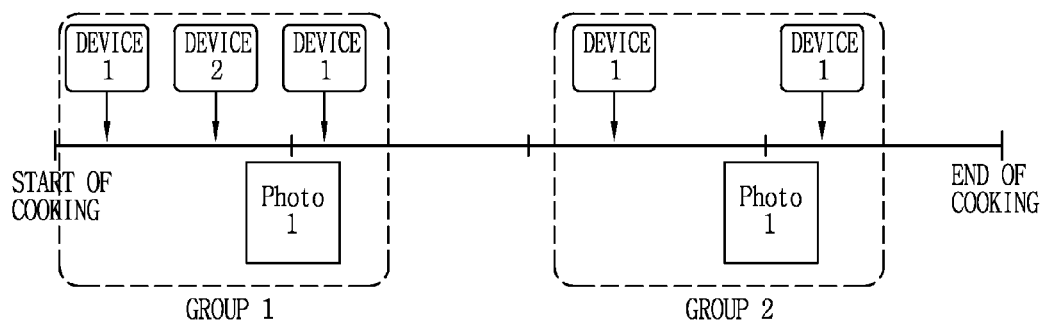

FIG. 7B
(a)
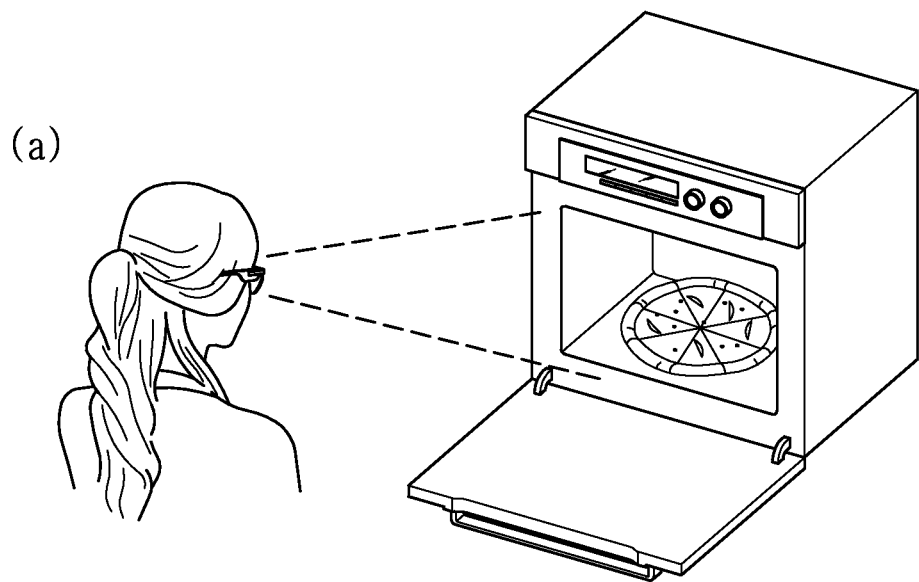
(b)
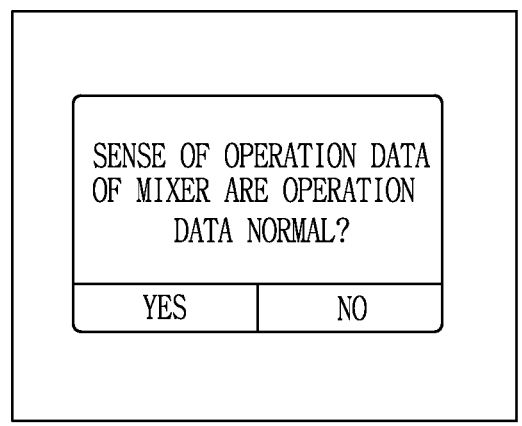
SENSE OF OPERATION DATA OF MIXER ARE OPERATION DATA NORMAL?
| YES | NO |

FIG. 8A
(a)
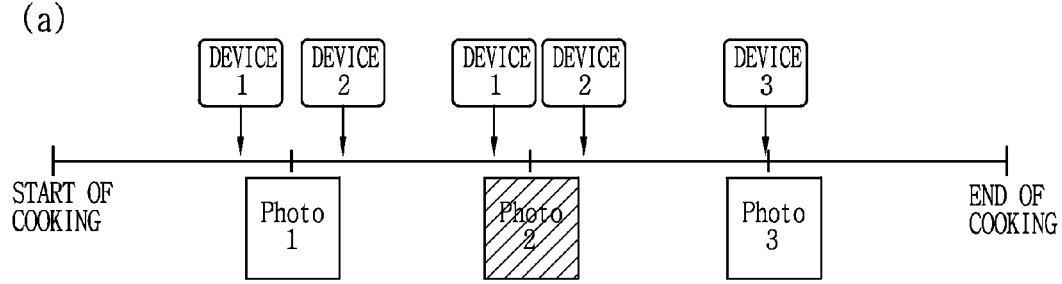
(b)
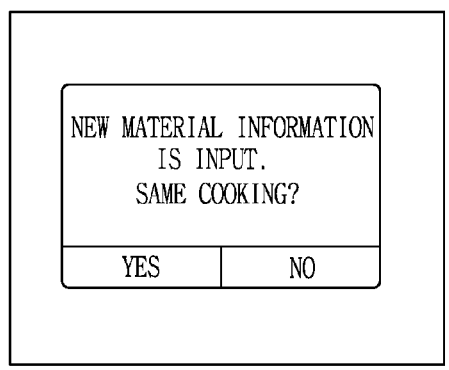

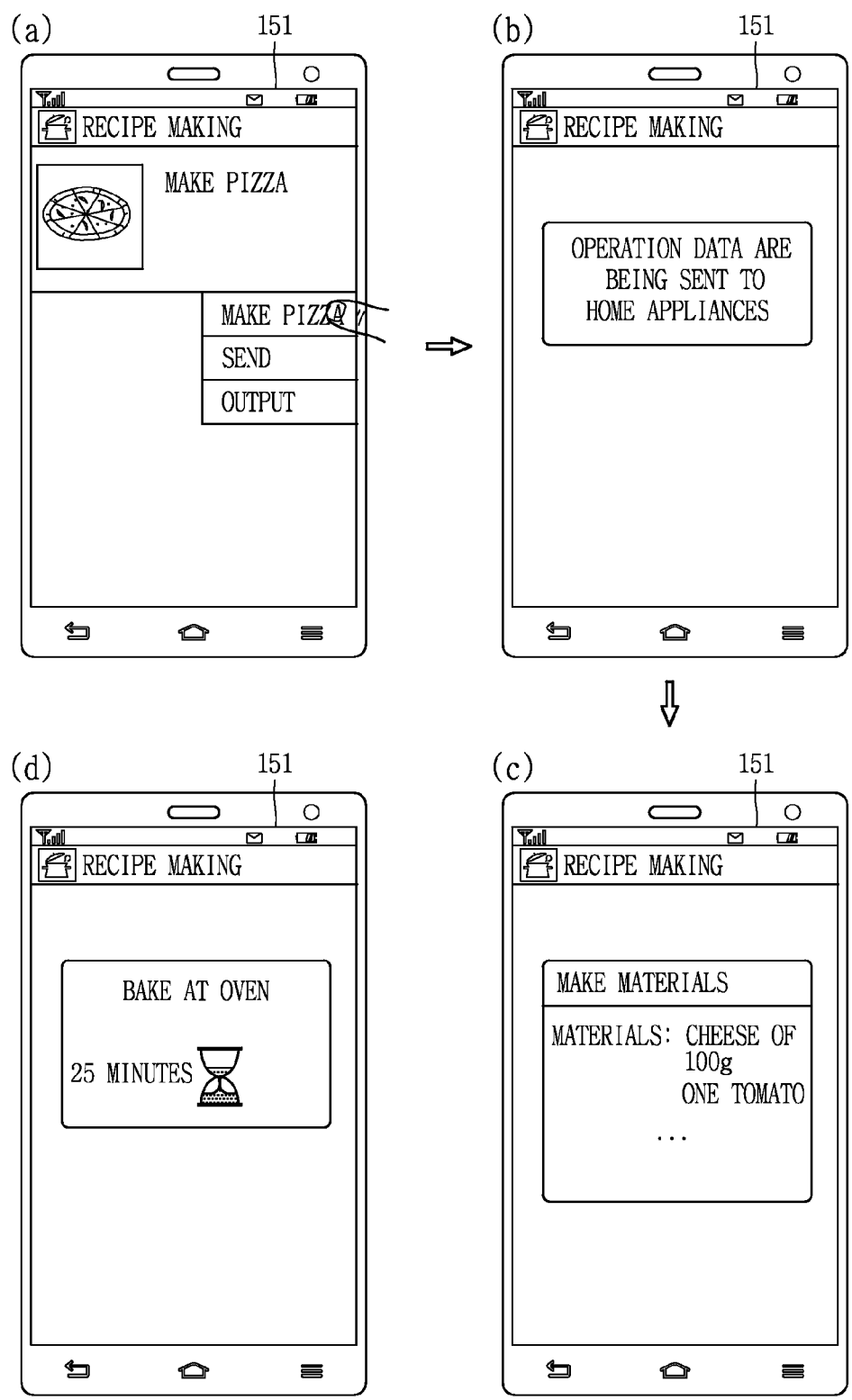

METHOD FOR GENERATING RECIPE INFORMATION IN MOBILE TERMINAL

CROSS-REFERENCE TO RELATED APPLICATION

Pursuant to 35 U.S.C. §119(a), this application claims the benefit of earlier filing date and right of priority to Korean Application No. 10-2013-0128720, filed on Oct. 28, 2013, the contents of which is incorporated by reference herein in its entirety.

BACKGROUND OF THE DISCLOSURE

1. Field of the Disclosure

The present disclosure relates to a mobile terminal, and more particularly to, a method for generating recipe information of a mobile terminal, in which information useful for a user is generated by taking a picture and using externally collected data.

2. Background of the Disclosure

A terminal is broadly categorized by mobility into a mobile/portable terminal and a stationary terminal. The display device is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the terminal are considered for supporting and improving functions of the display device.

In accordance with such improvement, the mobile terminal could have generated information useful for a user in addition to providing information to the user.

SUMMARY OF THE DISCLOSURE

Therefore, an aspect of the detailed description is to provide a mobile terminal that may generate information related to cooking and use the generated information and a method for generating recipe information of the mobile terminal.

To achieve these and other advantages and in accordance with the purpose of this specification, as embodied and broadly described herein, a mobile terminal for performing communication with at least one home appliance to generate recipe information comprises a camera configured to take images; a user input module configured to receive a user request for carrying out a function of generating recipe information; a wireless communication module configured to collect operation data of the at least one home appliance driven in association with cooking; and a controller configured to take the images received through the camera if a request for taking images received through the camera is received in a state that the function of generating recipe information is being carried out, and to process operation data collected from the at least one home appliance in association with the taken images.

In the embodiment, the controller processes the operation data collected from the at least one home appliance from the time when cooking starts to the time when cooking ends, in association with the images taken through the camera from the time when cooking starts to the time when cooking ends.

In the embodiment, the time when cooking starts and the time when cooking ends are determined on the basis of a control command based on input of the user, the start time and the end time when the operation data are collected from the at least one home appliance, or implementation and end of the function of generating recipe information.

In the embodiment, the controller generates the recipe information related to cooking in association with the taken images and the collected operation data from the time when cooking starts to the time when cooking ends.

In the embodiment, the controller tags the collected operation data to the images taken through the camera, and processes the taken images and the tagged operation data to be output together with each other if there is an output request for the generated recipe information.

In the embodiment, the collected operation data include driving information of the home appliance corresponding to the collected operation data.

In the embodiment, the driving information includes detailed driving information related to cooking and operation time of the home appliance corresponding to the driving information.

In the embodiment, if the function of generating recipe information is carried out, voice data received through a mike included in the mobile terminal are collected, and the collected voice data are processed together with the collected operation data and the taken images.

In the embodiment, the controller acquires material information through object recognition for a subject included in the taken images, and the material information is used to generate the recipe information together with the taken images and the collected operation data.

In the embodiment, the controller acquires information on a home appliance included in the taken images through object recognition, and among the collected operation data, the operation data collected from a home appliance which is not included in the taken images are not used to generate the recipe information.

In the embodiment, if a cooking menu which is a target for generating the recipe information is selected, the controller selectively processes the operation data only collected from the home appliance used to cook the selected cooking menu.

In the embodiment, the controller analyzes material information corresponding to subjects included in a plurality of images taken from the camera, and as a result if material information included in at least one of the plurality of images is different from that included in the other images, the controller generates information on a plurality of recipes corresponding to the different kinds of material information.

In the embodiment, if a cooking menu which is a target for generating the recipe information is selected and recipe information corresponding to the selected cooking menu is previously stored in a memory, the controller outputs information corresponding to a cooking procedure which is currently carried out on the basis of the taken images and the operation data, among the recipe information which is previously stored in the memory.

In the embodiment, if there is a request for editing the generated recipe information after the recipe information is completely generated, graphic objects representative of the home appliance corresponding to the collected operation data and the graphic objects corresponding to the taken images are output to the display module on the basis of a flow of time, and are moved on the display module on the basis of selection of the user, and if any one of the graphic objects is moved, time information corresponding to the moved graphic object is changed to correspond to the moved distance and moved location of the graphic object.

In the embodiment, the collected operation data are grouped with the taken images at a time similar to the time when the operation data are collected, the graphic objects corresponding to the operation data and the taken images, which are included in the same group, are output to their mutual periphery, and if any one of the graphic objects is moved, the group, which includes the moved graphic object, is changed.

In the embodiment, if a predetermined touch is given to any one of the graphic objects, the operation data or the taken image corresponding to the any one graphic object is excluded from the recipe information.

In the embodiment, the controller updates at least one of new material information, cooking information and home appliance information to the generated recipe information on the basis of selection of the user in accordance with the request for editing the generated recipe information.

In the embodiment, the controller generates an icon for receiving the output request of the generated recipe information after the recipe information is completely generated, and outputs the generated recipe information if the generated icon is selected after generation of the icon ends.

In the embodiment, an image representative of the generated icon corresponds to any one of the images included in the generated recipe information.

In the embodiment, if there is an output request of the generated recipe information, the controller transmits driving information to the home appliance corresponding to the operation data included in the recipe information, so that the corresponding home appliance may be driven in accordance with the operation data.

In another aspect of the present invention, a method for generating recipe information of a mobile terminal, which performs communication with at least one home appliance to generate recipe information comprises the steps of carrying out a function of generating recipe information on the basis of a user request; collecting operation data of the at least one home appliance driven in association with cooking; receiving a request for taking images received through a camera in a state that the function of generating recipe information is being carried out; and taking the images received through the camera in response to the request for taking images and processing the operation data collected from the at least one home appliance in association with the taken images.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 3 is a flow chart illustrating a method for generating recipe information of a mobile terminal according to the present invention;

FIG. 5 is a conceptional diagram illustrating a method for generating recipe information in a mobile terminal according to the present invention;

FIGS. 7a and 7b are conceptional diagrams illustrating an object recognition function in a method for generating recipe information of a mobile terminal according to the present invention;

FIGS. 8a and 8b are conceptional diagrams illustrating a method for generating information on a plurality of recipes in a mobile terminal according to the present invention;

FIGS. 10a, 10b and 10c are conceptional diagrams illustrating a method for using recipe information in a method for generating recipe information of a mobile terminal according to the present invention.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated. The suffixes attached to components of the wireless speaker, such as 'module' and 'unit or portion' were used for facilitation of the detailed description of the present invention. Therefore, the suffixes do not have different meanings from each other. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
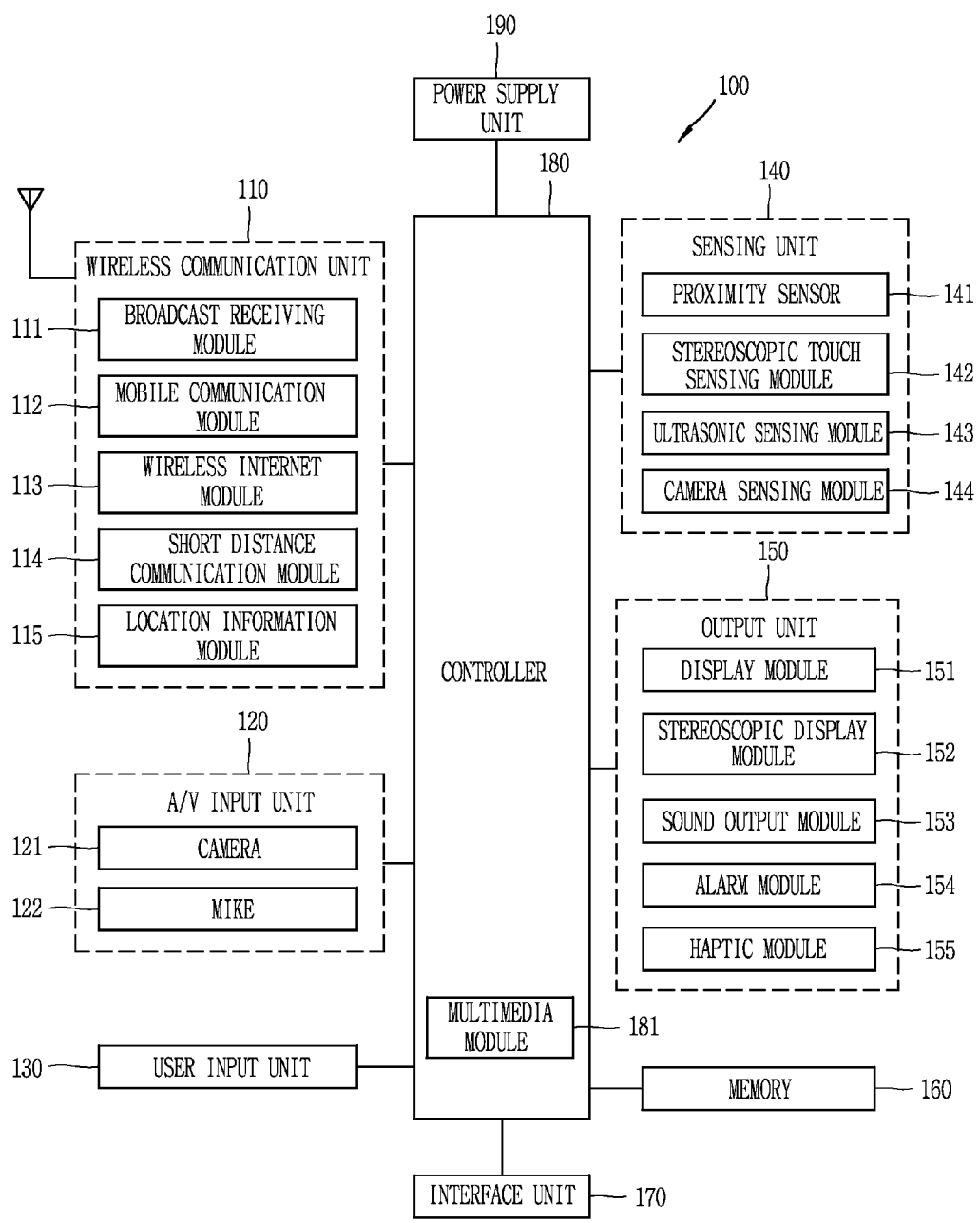
FIG. 1 is a block diagram illustrating a mobile terminal according to one embodiment disclosed in this specification.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

Referring to FIG. 1, the NV input unit 120 is configured to receive an audio or video signal. The NV input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display 151, an audio output unit 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
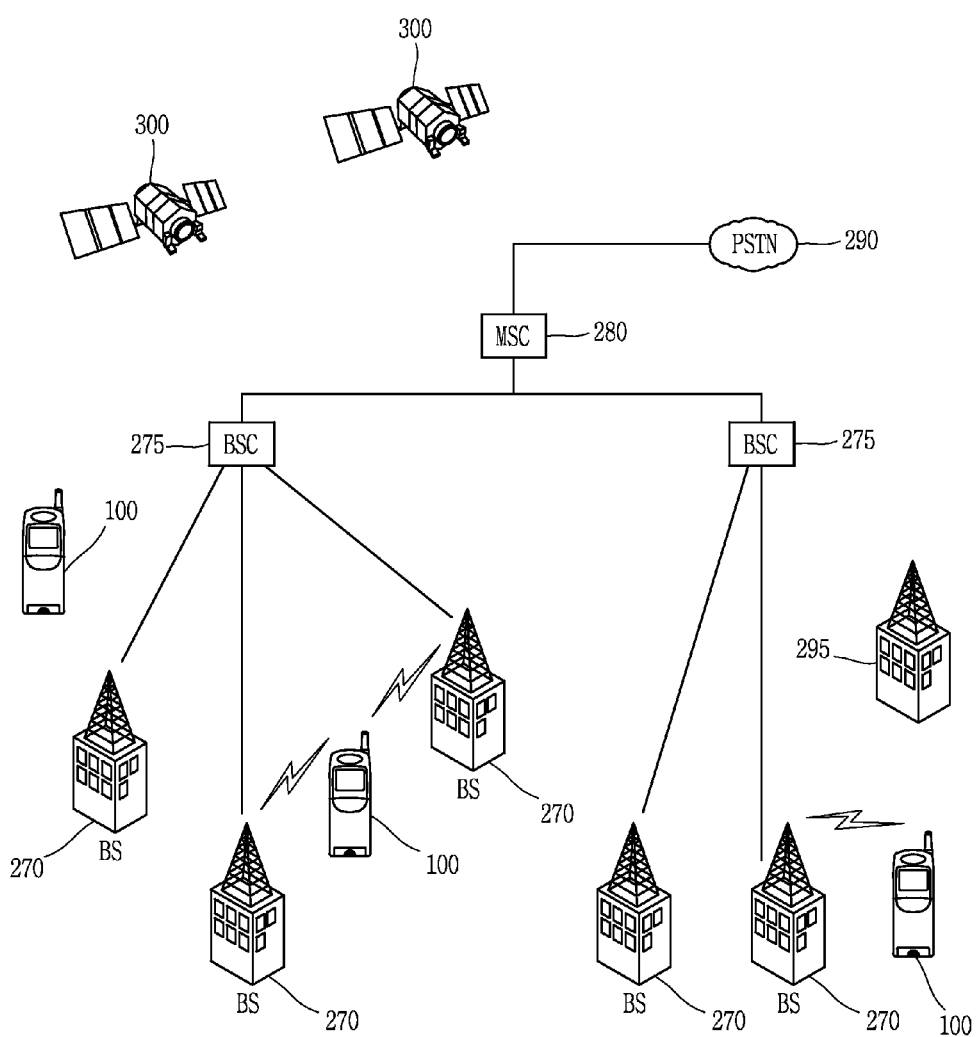
FIGS. 2a and 2b are conceptional diagrams illustrating a communication system that enables a mobile terminal according to the present invention to be operated.
Figure 2B:
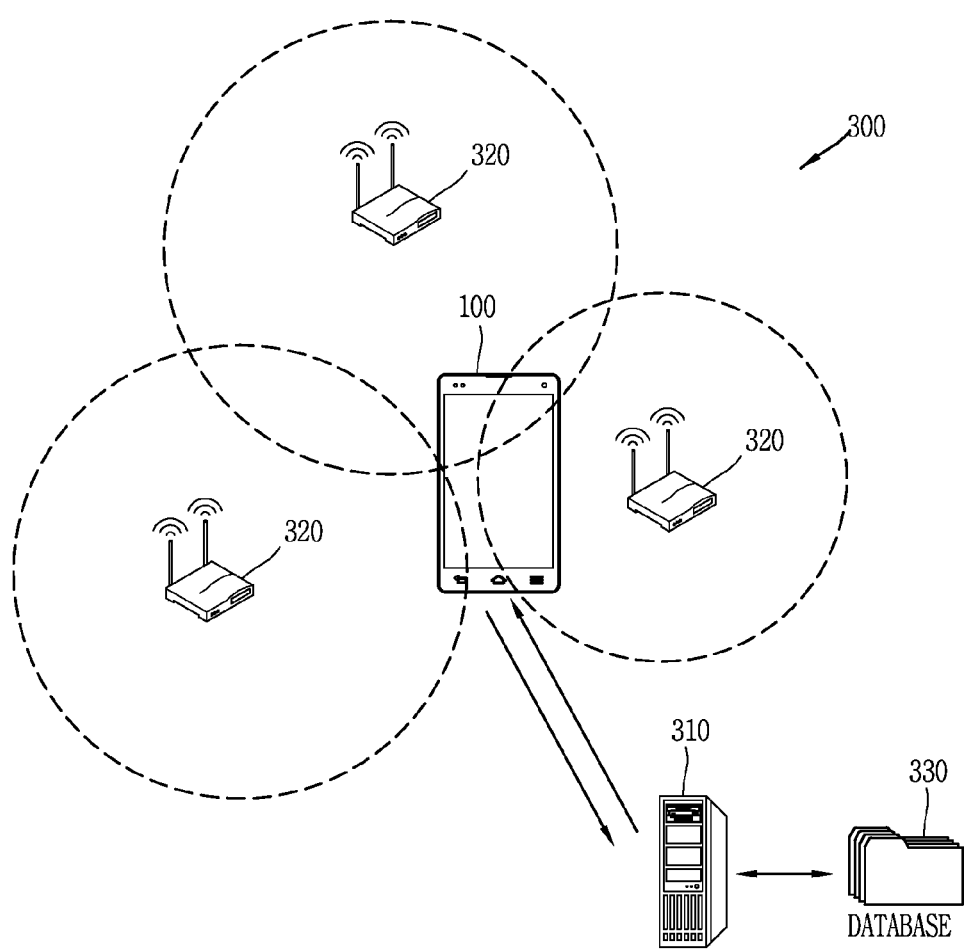

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminal s 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminal s 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminal s 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminal s 100. The mobile terminal s 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminal s 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Meanwhile, the mobile terminal according to the present invention, which includes at least one of the aforementioned elements, may generate recipe information to provide more useful function to a user. In this case, the recipe information means information on recipes, cooking processes, cooking materials, and home appliances, which are related to cooking. The mobile terminal may generate this recipe information and enables the generated recipe information to be shared or posted and also enables next cooking to be carried out with reference to the generated recipe information, whereby user convenience may be increased.

Figure 4A:
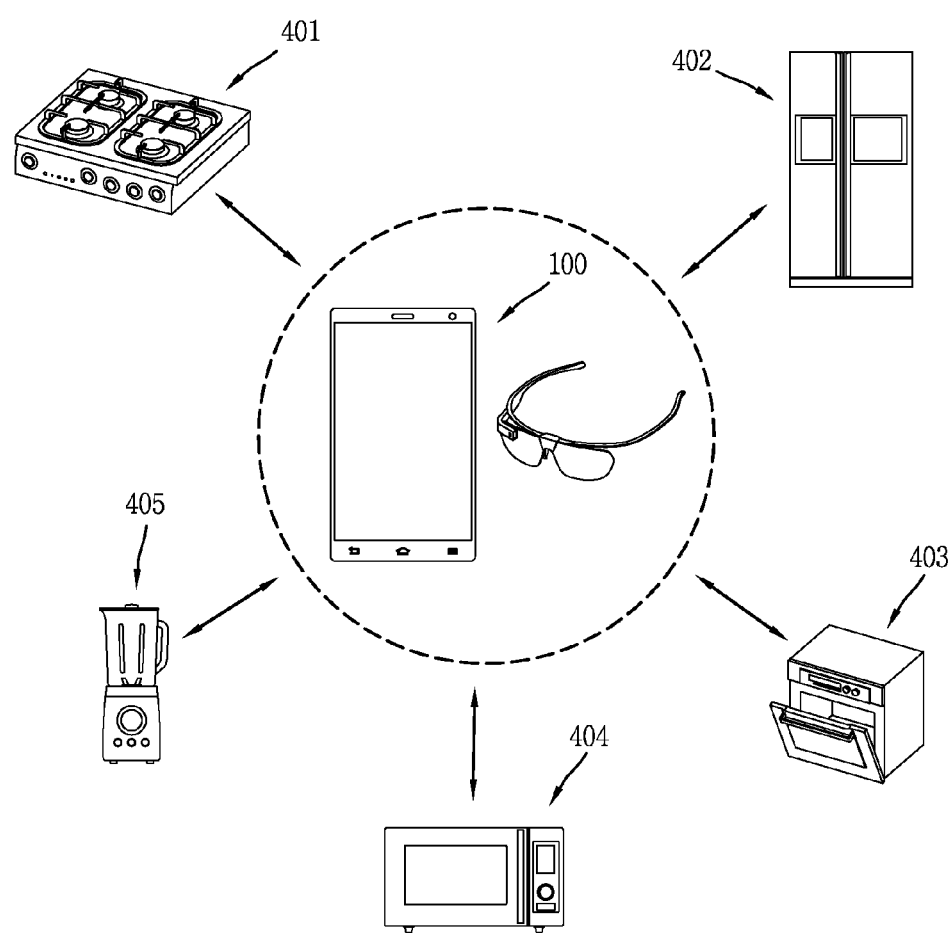
FIGS. 4a, 4b and 4c are conceptional diagrams illustrating the flow chart of FIG. 3.
Figure 4B:
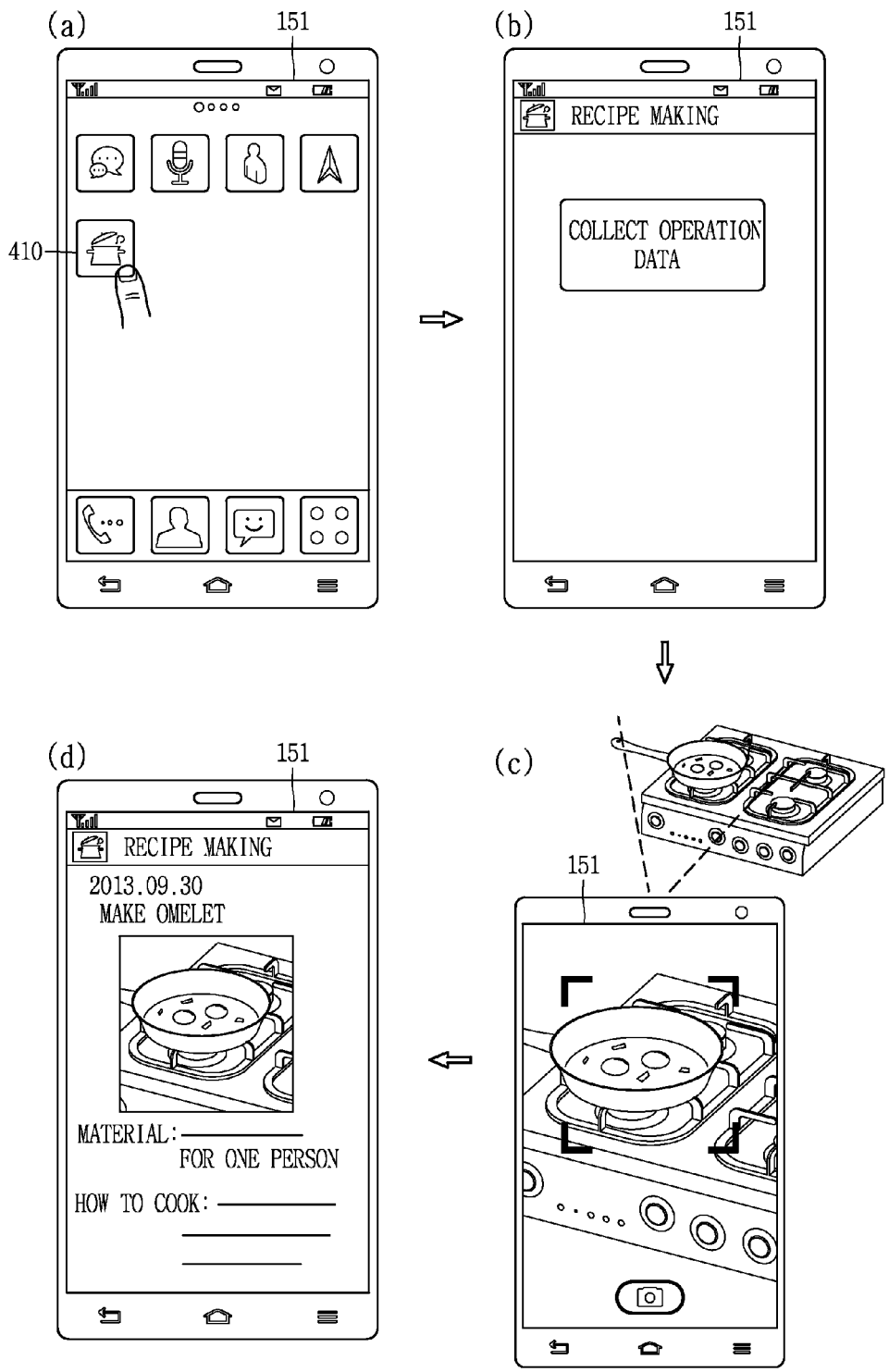
Figure 4C:
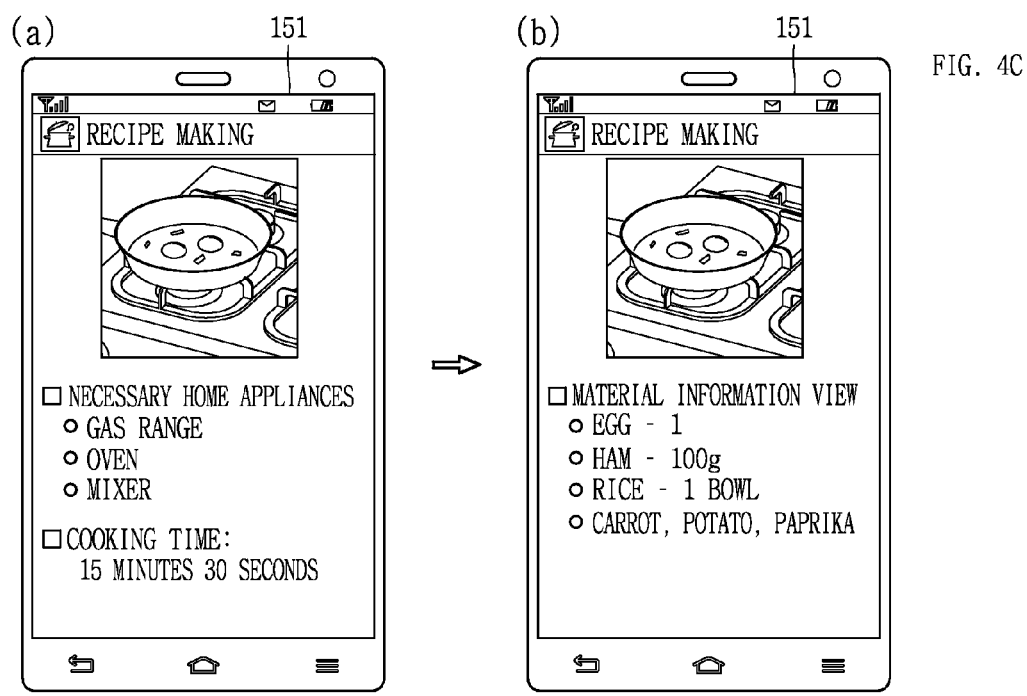

Hereinafter, a method for generating the recipe information will be described in more detail with reference to the accompanying drawings. FIG. 3 is a flow chart illustrating a method for generating recipe information of a mobile terminal according to the present invention, and FIGS. 4a, 4b and 4c are conceptional diagrams illustrating the flow chart of FIG. 3.

First of all, in order to generate recipe information in the mobile terminal according to the present invention, a function of generating recipe information, which is provided in the mobile terminal, is carried out (S310). In this case, the function of generating recipe information may be installed on the mobile terminal in the form of application. Also, the function of generating recipe information may be carried out on the basis of a request of the user. Also, the function of generating recipe information may automatically be carried out on the basis of information currently input to the mobile terminal even in case that there is no request of the user.

For example, in case that images are received through the camera included in the mobile terminal and subjects included in the received images are those related to cooking, the controller 180 may automatically carry out the function of generating recipe information. Also, in this case, the user may select whether to activate the function of generating recipe information, and the controller 180 may receive the selected function from the user.

In this way, if the function of generating recipe information is carried out, the controller 180 may perform communication with at least one home appliance through the wireless communication module 110. This communication with at least one home appliance may be performed in response to activation of the function of generating recipe information. Moreover, this communication with at least one home appliance may be performed in such a manner that the controller 180 may perform communication with the home appliances directly or through a home network or a central control server.

In this case, the home appliances, as shown in FIG. 4a, are various kinds of home appliances operated for cooking, and their examples may include a refrigerator, a microwave oven, an oven, a gas range, a mixer, a ventilator, an electric rice cooker, and a toaster. Meanwhile, these home appliances may perform communication with the mobile terminal according to one embodiment of the present invention by using at least one of Wireless-Fidelity (Wi-Fi), Digital Living Network Alliance (DLNA), Near Field Communication (NFC), Blue-Tooth (BT), and Wi-Fi Direct communication mode. Also, the home appliances which will perform communication to generate recipe information may be determined previously by selection of the user. In this case, the controller 180 may collect operation data only received from the previously determined home appliances.

In a state that the function of generating recipe information is carried out, the step of collecting operation data of at least one home appliance driven in respect of cooking to generate recipe information is carried out (S320).

In this case, the operation data may include at least one of identification information and driving information of the corresponding home appliance. The driving information includes the operation time of the home appliance corresponding to the driving information and detailed driving information related to cooking. For example, the driving information may be the information as to how long time the operation time has been required and as to what operation has been performed. For example, the 'gas range' will be described. In this case, the ignition start time of the gas range, the ignition end time of the gas range, the ignition sustain time of the gas range, and ignition strength may be the driving information.

Next, in a state that the function of generating recipe information is being carried out, the step of receiving a request for taking an image received through the camera is carried out (S330). As described above, the function of generating recipe information may be carried out to correspond to taking an image in response to the request for taking an image.

Meanwhile, the steps S320 and S330 are not restricted in their order, and the operations corresponding to the steps S320 and S330 may be carried at the same time.

As described above, if the request for taking an image is received, the step of taking the image received through the camera in response to the request and processing the taken image in association with the operation data collected from the at least one home appliance is carried out (S340).

In this case, the image, which is taken, may include information related to cooking, and the controller 180 may generate the recipe information by processing the image in association with the collected operation data. In other words, the recipe information may include photo information related to cooking and driving information of the home appliances.

Meanwhile, if the function of generating recipe information is carried out, the controller 180 may collect voice data received through a mike included in the mobile terminal and process the collected voice data together with the collected operation data and the taken image during the step of processing the image in association with the collected operation data, whereby the voice data may be included in the generated recipe information. Also, the controller 180 may convert the voice data in a speak to text (STT) manner, whereby the voice data may be included in the recipe information in the form of text. Accordingly, if the user carries out cooking while making an explanation through voice, the user's voice or voice-converted text may be included in the recipe information, whereby more plentiful recipe information may be generated.

Also, the controller 180 may receive the user's voice data through the mike together with peripheral sound and include the received data in the recipe information, whereby the atmosphere of a place where cooking is carried out may be transferred to the user vividly.

Also, in addition to the photo, voice and operation data, text or memo information may directly be input from the user to the controller 180 before or after the recipe information is generated, whereby the text or memo information may be used to generate the recipe information.

Meanwhile, if the image is acquired from the camera, the controller 180 may extract material information through object recognition for the subject included in the taken image. The extracted material information may be used together with the taken image and the collected operation data to generate the recipe information. As described above, in the method for generating recipe information in accordance with the present invention, even though the user does not input material information separately, the material information may be acquired automatically through the subjects included in the image, whereby user convenience may be improved.

Also, the controller 180 may acquire information on the home appliance included in the taken image in addition to the material information through object recognition. Accordingly, among the collected operation data, the operation data collected from the home appliance which is not included in the taken image may not be used to generate the recipe information. In other words, the controller 180 may prevent unnecessary information from being included in the recipe information due to the operation data received from the home appliance which is not used for cooking.

Also, if food or menu, which is a target for generating recipe information, is selected previously, the controller 180 may selectively process the operation data only collected from the home appliance used for cooking the selected food, among the operation data from the home appliances. In other words, the controller 180 may prevent unnecessary information from being included in the recipe information due to the operation data received from the home appliance which is not required to cook the selected food.

Meanwhile, in this case, information on the home appliance required for the selected food should previously be stored in the memory 160, and the controller 180 may generate the recipe information on the basis of the previously stored information. Also, if the above information is not stored previously, the controller 180 may extract necessary information through web search.

Meanwhile, if the food which is a target for generating recipe information is selected and recipe information corresponding to the selected food is previously stored in the memory, the controller 180 may output information of a portion corresponding to a cooking process which is currently carried out, from the previously stored recipe information, on the basis of the taken image and the collected operation data. As a result, the user may receive assistance for cooking.

Moreover, if the previously stored recipe information is different from the cooking process which is currently carried out, the controller 180 may compare the different portions with each other, and may additionally include information of the different portions in the previously stored recipe or include comparison information in the recipe which is currently generated.

As described above, the controller 180 may process the operation data collected from the at least one home appliance from the time when cooking is started to the time when cooking ends and the other data related to various foods in association with the image taken through the camera for the time when cooking is started and ends, thereby generating the recipe information.

In this case, the time when cooking is started and the time when cooking ends may be determined on the basis of a control command based on the input of the user, the time when the operation data start or end to be collected from the at least one home appliance, or implementation and end of the function of generating recipe information. In other words, according to the present invention, photos taken for a while cooking is being carried out and data collected for a while cooking is being carried out may be processed sequentially in accordance with the passage of time, whereby recipe information, which indicates what tasks have been performed until one food is completed, may be generated.

As described above, the controller 180 may generate the recipe information by tagging the collected operation data to the image taken through the camera, and if there is an output request for the generated recipe information, the controller 180 may output the tagged operation data together with the taken image.

For example, referring to FIG. 4b(a), the function of generating recipe information may be carried out in response to selection of an icon 410 of an application. This icon 410 may be output on a home screen page or a menu page. In this way, if the function of generating recipe information is carried out to correspond to selection of the icon 410, the controller 180 receives operation data from at least one home appliance as shown in FIG. 4b(b). Although not shown, the controller 180 may output notification information notifying that the operation data have been received, and may determine whether to include the received operation data in the recipe information on the basis of selection of the user.

Also, as shown in FIG. 4b(c), if the image is taken, the controller 180 may generate the recipe information together with the collected operation data by using the taken photo as shown in FIG. 4b(d). In this case, the recipe information may be generated using the data only collected from the mobile terminal. Moreover, the recipe information may be generated using the data collected from the mobile terminal together with the information input from the user.

The generated recipe information may include a cooking date, a cooking menu, a cooking photo, cooking materials, the amount of cooking, a cooking method, a necessary home appliance, a cooking time, and material information, as shown in FIG. 4b(d) and FIGS. 4c(a) and 4c(b). Also, although not shown, the recipe information may include detailed driving information of the home appliance.

Meanwhile, the material information may be acquired through images or may be input from the user. Moreover, the material information may be acquired through communication with the refrigerator. For example, after the function of generating recipe information is carried out, the controller 180 may acquire information on materials, which are taken out from the refrigerator, from the refrigerator. In other words, the refrigerator may store and recognize information on materials currently kept therein and material information taken out therefrom.

As described above, in the method for generating recipe information of the mobile terminal according to the present invention, the recipe information may be generated using photos taken during a cooking process and data collected from an external home appliance. Accordingly, since the user may acquire the recipe information by taking photos during cooking without separately writing recipe information, the time for generating the recipe information may be saved and the generated recipe information may be used again or shared with friends. As a result, user convenience may be improved.

Hereinafter, a method for generating recipe information will be described in more detail with reference to the afore- mentioned method for generating recipe information together with the accompanying drawings. FIG. 5 is a conceptional diagram illustrating a method for generating recipe information in a mobile terminal according to the present invention.

An example of processing data collected to correspond to the function of generating recipe information, which is carried out, will be described. As shown in FIG. 5(a), the operation data and photos which are collected may be listed on the basis of the time when the data and photos are collected or taken. In other words, the controller 180 may process the operation data and the photos in association with one another on the basis of the time. The controller 180 may group the operation data collected at a time zone similar to the time when the photos are taken, as associated data. For example, the operation data related to the photo 1 may be grouped with the operation data collected from device 1 (or home appliance), device 2 and device 1, which are collected at a time zone similar to the time when the photo 1 is taken, as shown in FIG. 5(b). In other words, if the photo 1 is output, the operation data grouped with the photo 1 may be output together with the photo 1.

As shown in FIG. 5(a), if a photo 2 is taken and the operation data are collected from the devices 1 and 2 at a time zone similar to the time when the photo 2 is taken, the controller 180 may group the operation data collected from the photo 2, the device 1 and the device 2 as shown in FIG. 5(b).

As described above, the controller 180 may group the data collected until cooking ends after cooking starts, on the basis of collection or taking at an associated time zone. Also, if the output for the generated recipe information is requested, the controller 180 may sequentially output the data for each group.

Figure 6A:
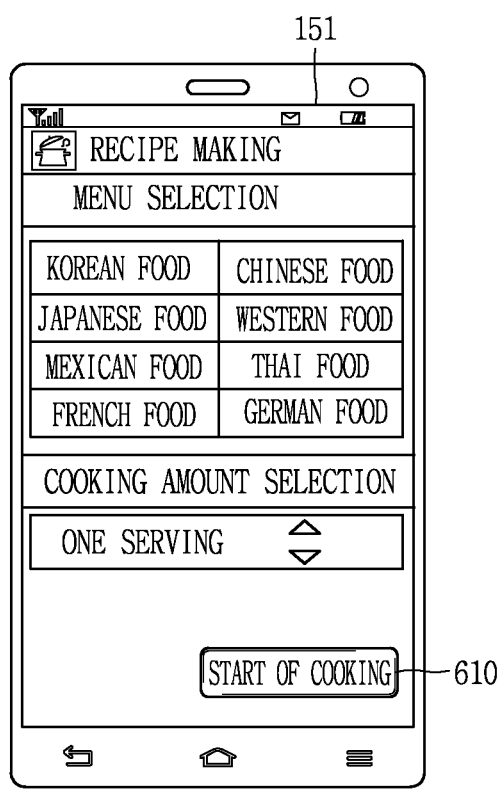
FIGS. 6a and 6b are conceptional diagrams illustrating a cooking time in a method for generating recipe information of a mobile terminal according to the present invention.
Figure 6B:
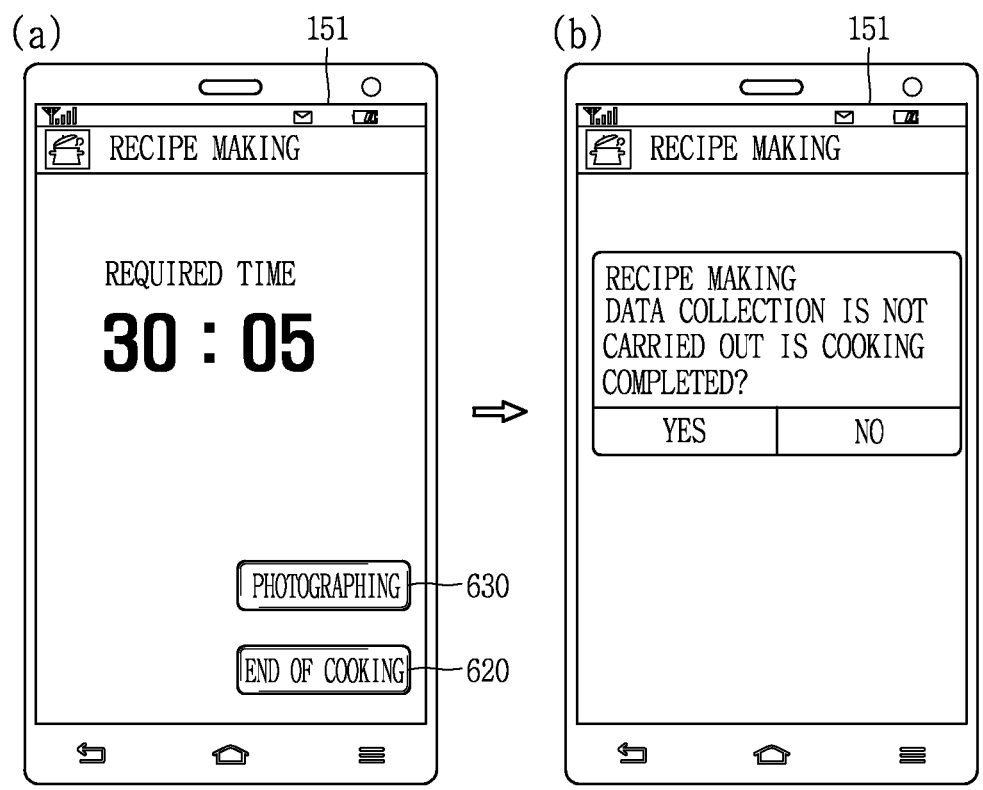

Hereinafter, the time when the recipe information is generated will be described in more detail with reference to the accompanying drawings. FIGS. 6a and 6b are conceptional diagrams illustrating a cooking time in a method for generating recipe information of a mobile terminal according to the present invention.

As described above, the function of generating recipe information according to the present invention may be carried out by a request of the user. The controller 180 may regard that cooking has started, as the function is carried out. And, the controller 180 may determine a start timing point of cooking based on a control command input from the user. For example, as shown in FIG. 6a, an icon 610 for receiving a control command for start of cooking may be provided separately. If the icon 610 is selected by the user, the controller 180 may start counting of a cooking time.

Also, in the present invention, a control command for indicating a cooking start timing point may be received through a voice of the user. In other words, if a voice command, which is previously set, is received from the user, the controller 180 may start counting for a cooking time.

Meanwhile, this cooking may started after a kind or menu of food to be cooked is selected. As described above, the recipe information may be generated with reference to selection of the menu. The recipe information on the menu may previously be stored in the memory 160, and the controller 180 may use the recipe information, which is previously stored in the memory 160, for recipe information which is newly generated.

Meanwhile, if the cooking start timing point is determined as above, a cooking end timing point may also be determined based on selection of the user. For example, as shown in FIG. 6b(a), an icon 620 for receiving information on a cooking end timing point may be provided separately. If the icon 620 is selected by the user, the controller 180 may end counting of a cooking time. In other words, if the icon 620 is selected, the controller 180 may generate recipe information by using the data collected for the time when the cooking time is counted after cooking starts.

Meanwhile, as shown in FIG. 6*a*, if the icon 610 for starting cooking is selected, the controller 180 may switch the display module 151 as shown in FIG. 6*b*(*a*), and the counted time may be displayed on the switched screen in real time. This screen may be provided with a photographing icon 630, whereby the user may directly select a photographing function.

Also, in the present invention, the control command for indicating the cooking end timing point may be received through a voice of the user. In other words, if the voice command which is previously set is received from the user, the controller 180 may end counting for the cooking time.

Also, if the operation data are not collected from the home appliance for a predetermined time or if photographing is not carried out, the controller 180 may determine whether cooking ends automatically, and may generate recipe information by using the collected data.

Also, as shown in FIG. 6*b*(*b*), the controller 180 may be confirmed from the user whether cooking has ended, by outputting notification information indicating that data are not collected. For example, if "yes" is selected by the user, the controller 180 may determine that cooking ends, end counting of the cooking time, and generate recipe information by using the collected data. And, if "continue" is selected by the user, the controller 180 may continue to count the cooking time.

Figure 7A:
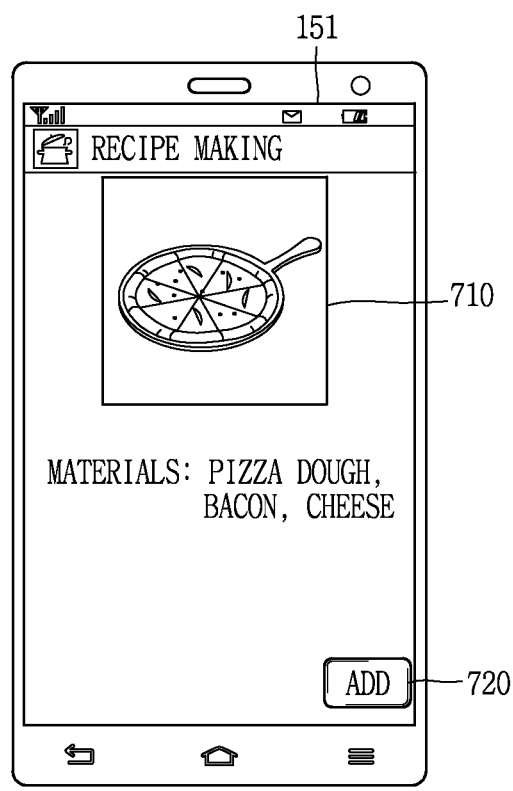

Hereinafter, a method for using an object recognition function in generating recipe information will be described in more detail with reference to the accompanying drawings. FIGS. 7*a* and 7*b* are conceptional diagrams illustrating an object recognition function in a method for generating recipe information of a mobile terminal according to the present invention.

As described above, if the image is acquired from the camera, the controller 180 may extract material information through object recognition for a subject included in the taken image. For example, as shown in FIG. 7*a*, if the photo is taken, the controller 180 may recognize material information included in the taken photo 710. The extracted material information may be used together with the taken image and the collected operation data in generating recipe information. Also, material information which is not recognized from the taken photo may be input from the user separately. For example, it is difficult to recognize a liquid material such as a sauce (for example, olive oil) through object recognition. Accordingly, this material information may be input from the user. For example, the user may additionally input the material information through an 'add' icon 720. In this way, in the method for generating recipe information according to the present invention, even though the user does not input material information separately, information on materials may be acquired automatically through the subjects included in the image, whereby user convenience may be improved.

Also, the controller 180 may acquire information on a home appliance included in the taken image in addition to acquisition of the material information through object recognition. Accordingly, among the collected operation data, the operation data collected from a home appliance which is not included in the taken image may not be used in generating the recipe information. In other words, the controller 180 may prevent unnecessary information from being included in the recipe information due to the operation data received from the home appliance which is not used for cooking.

Also, the mobile terminal according to the present invention may be configured as a wearable mobile terminal as shown in FIG. 7*b*(*a*). For example, the wearable mobile terminal may be a glasses type mobile terminal. A lens part of the glasses type mobile terminal may be a display module, wherein the lens part is located at both eyes of the user, and the controller 180 may recognize a subject that transmits the display module. Accordingly, the controller 180 may acquire material information and information on the home appliance which is used, by recognizing the subject transmitting the display module. For example, if the operation data are collected from the home appliance which is not transmitted through the display module, that is, if the operation data are collected from the home appliance which is out of the user's view, the operation data may be excluded in generating the recipe information. In other words, the controller 180 may regard information received from the subject which is not viewed by the user, as data which are not required in generating the recipe information.

Also, as shown in FIG. 7*b*(*b*), if the operation data are received from the home appliance which is currently out of the user's view, the user may select whether to use the operation data, and the controller 180 may receive the result selected by the user, whereby exactness in using information may be improved.

Figure 8B:
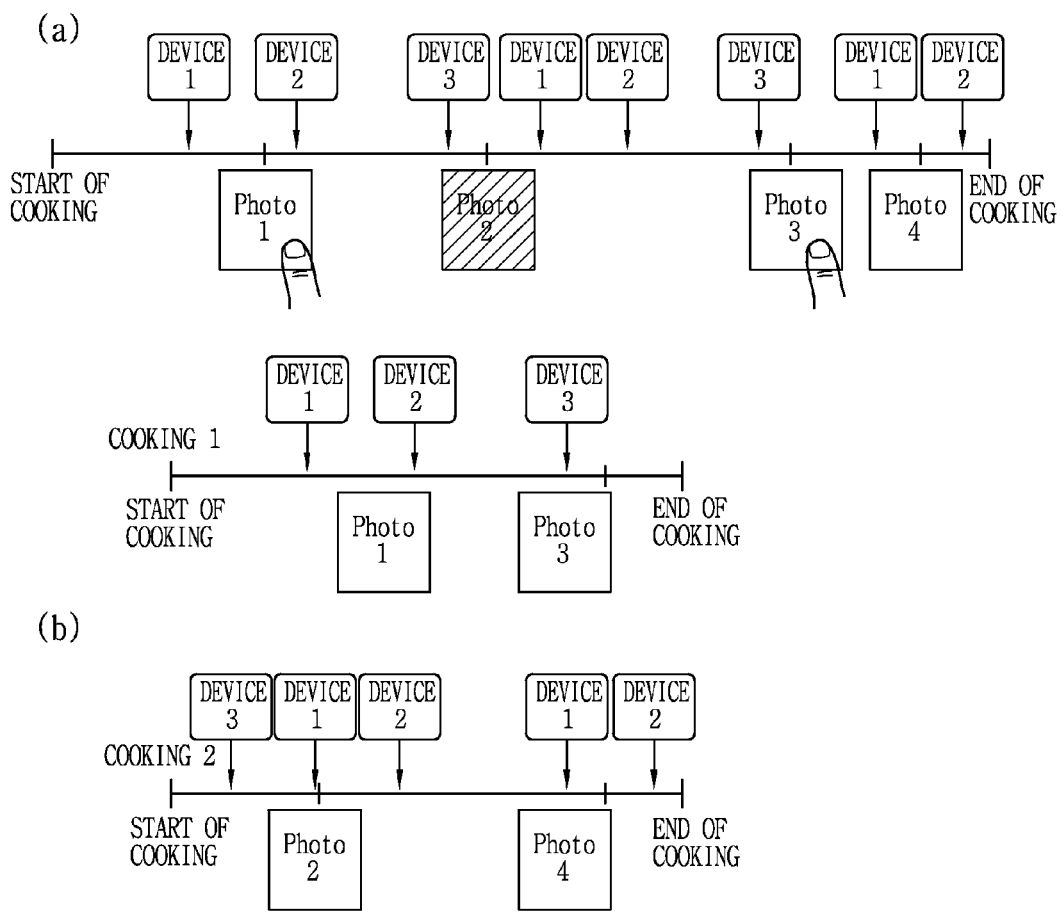

Hereinafter, if a plurality of menus are cooked at the same time, a method for generating recipe information will be described in more detail with reference to the accompanying drawings. FIGS. 8*a* and 8*b* are conceptional diagrams illustrating a method for generating information on a plurality of recipes in a mobile terminal according to the present invention.

In the method for generating recipe information according to the present invention, if a plurality of menus are cooked at the same time, information on a plurality of recipes for the plurality of menus may be generated. The information on the plurality of recipes may be generated based on selection of the user. If not so, the information on the plurality of recipes may be generated automatically by the controller 180 on the basis of photos which are taken or operation data.

For example, the controller 180 may analyze material information corresponding to subjects included in a plurality of images taken from the camera. As a result, if material information included in at least one of the plurality of images is different from that included in the other images, the controller 180 may generate information on a plurality of recipes corresponding to the different kinds of material information. As shown in FIG. 8*a*(*a*), if photos 1, 2 and 3 are taken and material information included in the photo 2 is different from that included in the photos 1 and 3, the controller 180 may generate new recipe information by using the photo 2. At this time, the controller 180 may generate recipe information by processing the operation data collected at a time zone similar to the time when the photo 2 is taken, in association with the photo 2.

In this case, as shown in FIG. 8*a*(*b*), the controller 180 may output notification information indicating that new material information has been recognized. Through the output of the notification information, the controller 180 may receive corresponding information from the user who has selected whether to generate new recipe information.

Also, the controller 180 may generate information on a plurality of recipes on the basis of selection of the user after photos are taken and data are collected. For example, as shown in FIG. 8*b*, if the photos 1 and 3 relate to first cooking and the photos 2 and 4 relate to second cooking, the controller 180 may respectively classify the data on the first cooking and the second cooking and respectively generate recipe information on the first cooking and recipe information on the second cooking by using the classified data.

The controller 180 may output the data collected to classify the data on the basis of selection of the user, and various graphic user interfaces (GUI) for selection may be provided.

Figure 9A:
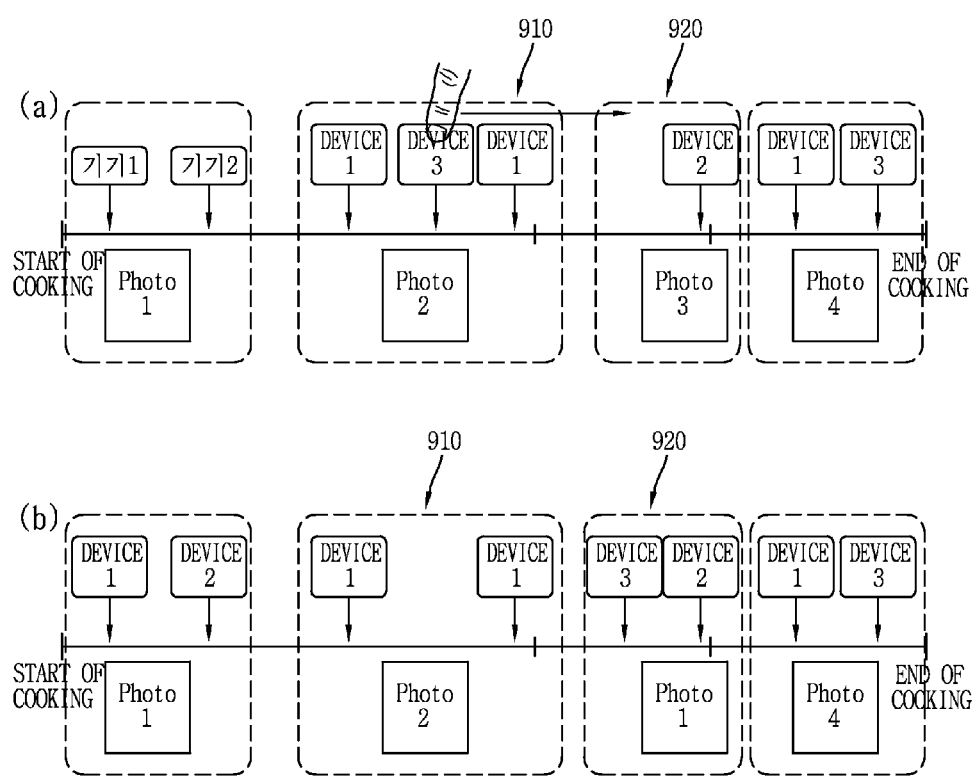
FIGS. 9a, 9b and 9c are conceptional diagrams illustrating a method for editing recipe information in a method for generating recipe information of a mobile terminal according to the present invention.
Figure 9B:
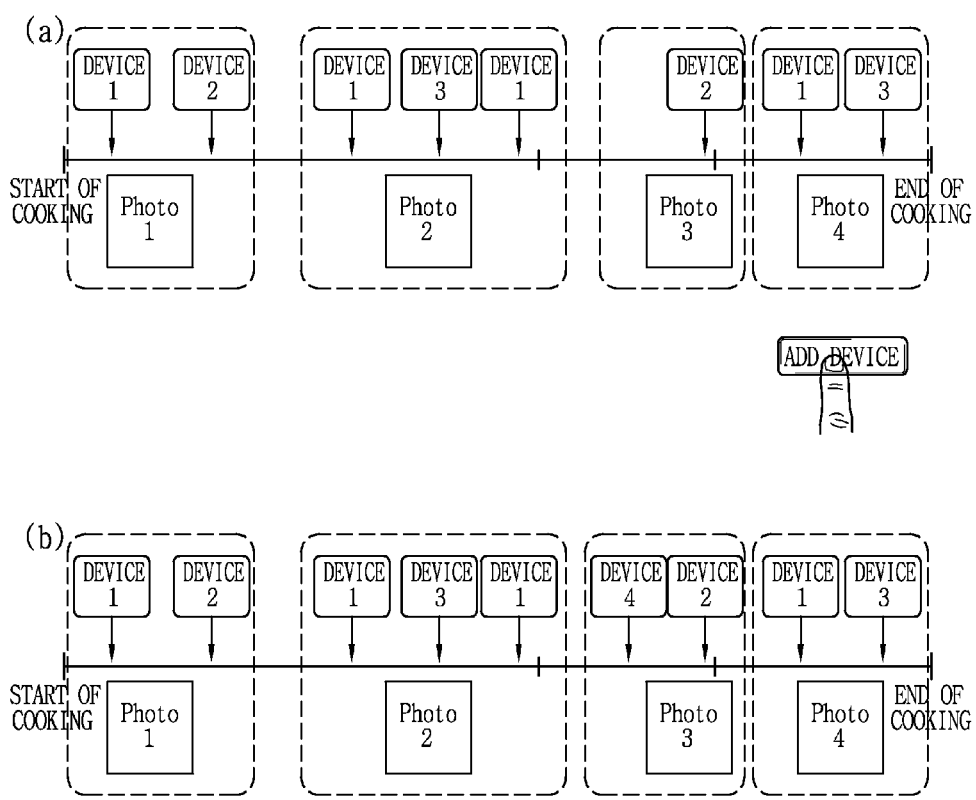
Figure 9C:
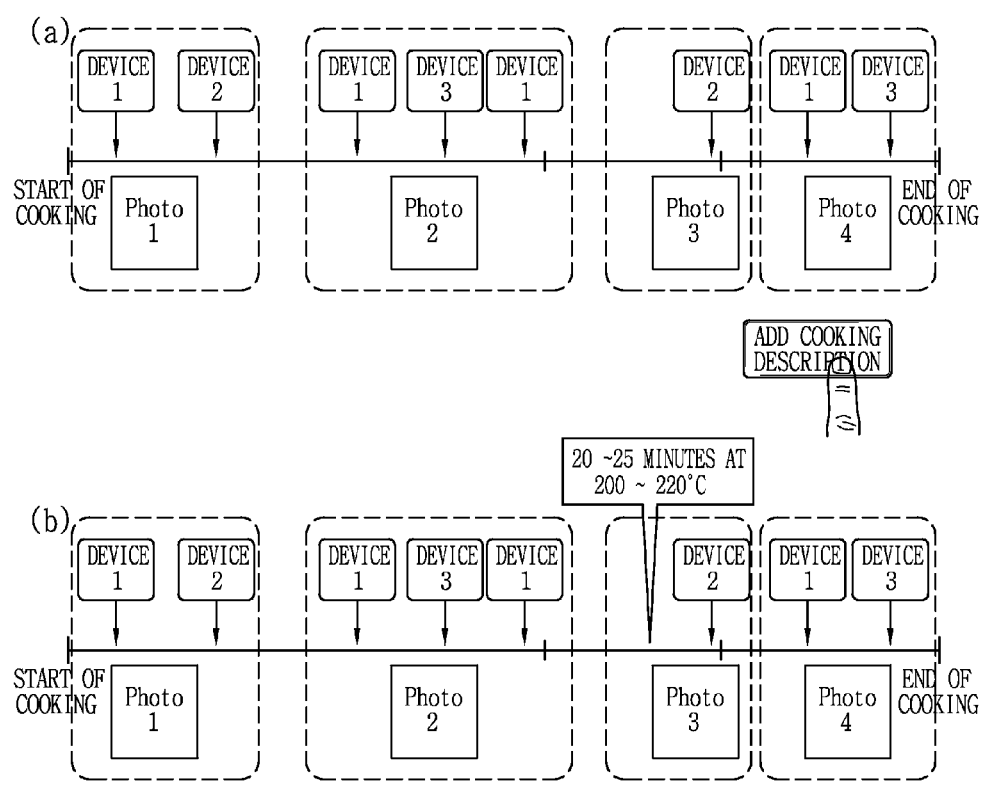

Hereinafter, a method for editing the generated recipe information will be described in more detail with reference to the accompanying drawings. FIGS. 9*a*, 9*b* and 9*c* are conceptional diagrams illustrating a method for editing recipe information in a method for generating recipe information of a mobile terminal according to the present invention.

In the method for generating recipe information according to the present invention, after the recipe information is generated, editing for the generated recipe information may be performed.

For example, after the recipe information is completely generated, if there is a request for editing for the generated recipe information, the controller 180 may graphic objects representative of the home appliance corresponding to the operation data included in the generated recipe information and graphic objects corresponding to the taken image on the display module 151 on the basis of time as shown in FIG. 9*a*(*a*). These graphic objects may be moved on the display module 151 in accordance with a touch of the user therefor. The controller 180 may edit the recipe information through such movement of the graphic objects. As shown in FIG. 9*a*(*a*), if the graphic object corresponding to the operation data collected from the device 3 included in the second group 910 moves to the group 3 920, the controller 180 may process the operation data corresponding to the moved graphic object in association with the data included in the group 3 as shown in FIG. 9*a*(*b*). In other words, if any one of the graphic objects is moved, the controller 180 may change time information corresponding to the moved graphic object to correspond to the moved distance and the moved location of the graphic. Accordingly, the operation related to the operation data for the device corresponding to the moved graphic object may be processed as the operation performed at the time when the photo 3 is taken. In this way, the controller 180 may edit the recipe information through the movement of the graphic object. Also, the controller 180 may edit the time consumed for cooking through the above procedure.

As shown, the collected operation data may be grouped with the image taken at the time similar to the time when the operation data are collected, the graphic objects corresponding to the taken image and the operation data included in the same group may be output in their periphery. Accordingly, if any one of the graphic objects is moved, the group which includes the moved graphic object may also be changed. Accordingly, when the recipe information is output for each group, the output order of the operation data corresponding to the moved graphic object may be changed.

Also, although not shown, if a touch which is previously set is given to any one of the graphic objects, the operation data or taken image corresponding to the one graphic object may be excluded from the recipe information. For example, if any one graphic object is dragged to a predetermined zone or a predetermined distance or more, the controller 180 may delete the data corresponding to the corresponding graphic object on the recipe information.

The controller of the mobile terminal may update at least one of new material information, cooking information and device information on home appliance to the generated recipe information on the basis of selection of the user. For example, as shown in FIGS. 9*b*(*a*) and 9*b*(*b*), if a 'device information add' function or a 'cooking description add' function is selected, the controller 180 may update the recipe information on the basis of information input from the user.

As described above, in the method for generating recipe information of the mobile terminal according to the present invention, since editing for the generated recipe may be performed, the user may generate more exact recipe information by complementing the generated recipe.

Figure 10A:
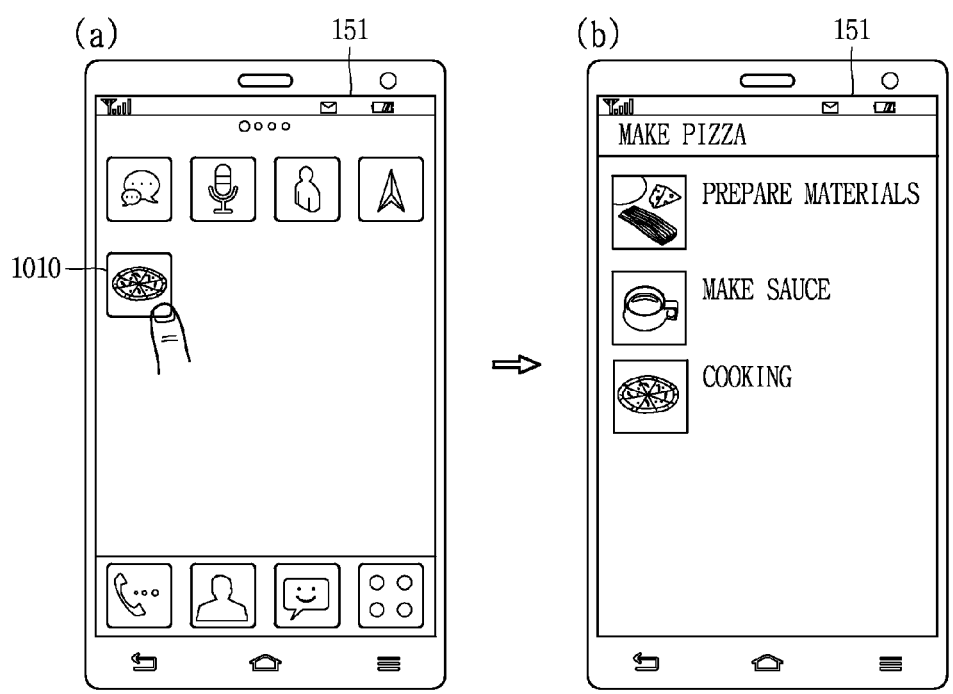
Figure 10B:
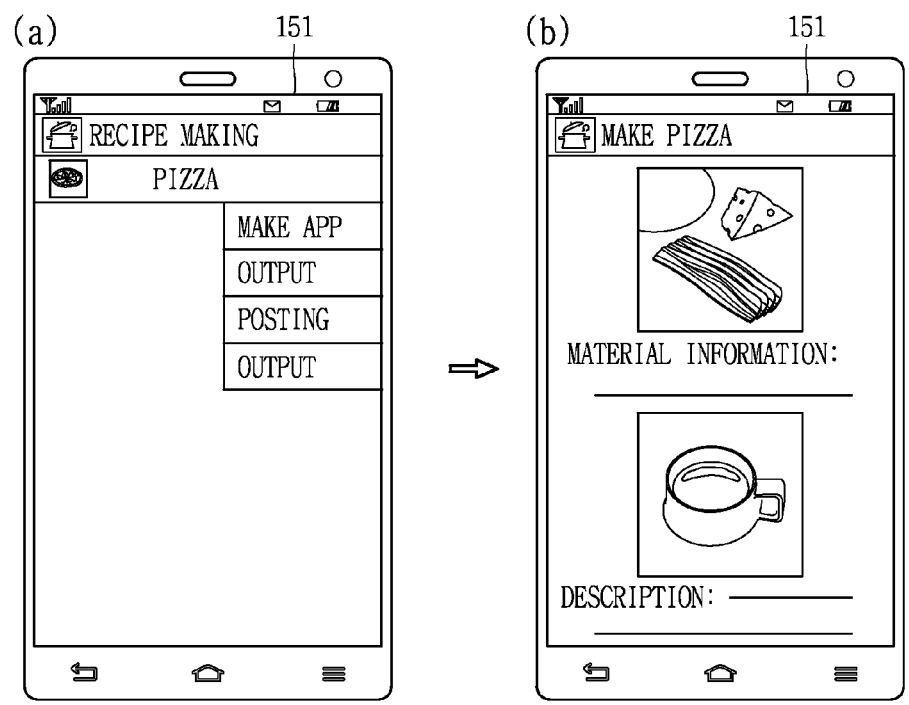

Hereinafter, a method for using the generated recipe information in various manners will be described in more detail with reference to the accompanying drawings. FIGS. 10*a*, 10*b* and 10*c* are conceptional diagrams illustrating a method for using recipe information in a method for generating recipe information of a mobile terminal according to the present invention.

As described above, if the recipe information is generated, the generated recipe information may be used in various manners. For example, as shown in FIG. 10*a*(*a*), the controller 180 may generate an icon 1010 for receiving an output request of the generated recipe information. An image representative of the generated icon may correspond to any one of images included in the generated recipe information. If a plurality of images are included in the recipe information, the controller 180 may use an image based on selection of the user as a representative image, or may obtain by combining the plurality of images.

Meanwhile, after this icon is generated, if the generated icon 1010 is selected, as shown in FIG. 10*a*(*b*), the controller 180 may output the generated recipe information.

As described above, the controller 180 may output the recipe information in due order by identifying the recipe information for each group. The controller 180 may generate a list of the recipe information on the basis of each group and selectively output the recipe information on the list selected by the user.

An example of using the generated recipe will be described. As shown in FIG. 10*b*, the controller 180 may output a list of functions that may be performed using the selected recipe. Examples of the function may include a app making function, an output function, a posting function, a send function, and a cooking function. For example, if the posting function is selected, the controller 180 may upload the corresponding recipe in a social network service (SNS) site linked with an account of the user. In other words, the user may upload a post for a recipe by using the generated recipe without directly drafting the post for the recipe.

For another example, if the send function is selected, the controller 180 may transmit the recipe information to the external device or the external server, which has identification information based on selection of the user. Accordingly, the user may share recipes with friends.

For still another example, as shown in FIG. 10*c*(*a*), if the cooking function is selected, the controller 180 may transmit driving information to the home appliance corresponding to the operation data included in the recipe information as shown in FIG. 10*c*(*b*), whereby the corresponding home appliance may be driven in accordance with the corresponding operation data. In this case, the controller 180 may transmit the operation data to the home appliance only based on selection of the user among the plurality of home appliances. Meanwhile, as the controller transmits the operation data to the corresponding home appliance, the home appliance may be preheated, or may be prepared to allow the user to immediately carry out cooking.

Moreover, if at least one of the home appliances corresponding to the operation data included in the recipe information is not possible to perform communication (for example, if there is no corresponding home appliance, or if communication with the corresponding home appliance is not connected), the controller 180 may transmit the operation data to the home appliance having a function similar to that of at least one of the home appliances which perform communication with the wireless communication module 110. In other words, the controller 180 may allow a similar home appliance, if not the home appliance corresponding to the operation data, to carry out cooking.

Also, the controller 180 may output information on another recipe or cooking utensils, which may replace the function of the at least one home appliance. The information on another recipe or cooking utensils may previously be stored in the memory 160. Also, the controller 180 may search for the information on another recipe or cooking utensils from at least one server accessed through wireless communication and output the searched information.

Meanwhile, the controller 180 may first checks whether there is the similar home appliance, and if there is no similar home appliance, the controller 180 may search for information on another recipe or cooking utensils, which may replace the function of the at least one home appliance.

Also, as shown in FIGS. 10c(c) and 10c(d), the controller 180 may output the recipe information in accordance with flow of time, whereby the user may carry out cooking in due order in accordance with cooking information included in the recipe information.

Meanwhile, the method for using recipe information is not limited to the aforementioned examples, and various methods for using recipe information may exist in addition to the aforementioned examples.

As described above, in the method for generating recipe information of the mobile terminal according to the present invention, the generated recipe may be used in accordance with various methods, whereby user convenience may be improved.

Also, in the method for generating recipe information of the mobile terminal according to the present invention, the recipe information may be generated using the photos taken during cooking and the data collected from the external home appliance. Accordingly, the user may acquire the recipe information by taking photos during cooking without writing the recipe information separately, whereby the time for generating the recipe information may be saved, and the user may again use the generated recipe information and share the recipe information with friends. As a result, user convenience may be improved.

The aforementioned method according to the embodiment may be implemented in a recording medium, in which a program is recorded, as a code that can be read by a computer. The recording medium that can be read by the computer include all kinds of recording devices in which data readable by a computer system are stored. Examples of the recording medium that can be read by the computer include a ROM, a RAM, a CD-ROM, a magnetic tape, a floppy disk, and an optical data memory. Also, another example of the recording medium may be implemented in a type of carrier wave (for example, transmission through Internet). Also, the computer may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal for performing communication with at least one home appliance to generate recipe information, comprising:
    a camera configured to take images;
    a user input module configured to receive a user request for carrying out a function of generating recipe information;
    a wireless communication module configured to collect operation data of the at least one home appliance driven in association with cooking; and
    a controller configured to take the images received through the camera if a request for taking images received through the camera is received in a state that the function of generating recipe information is being carried out, and to process operation data collected from the at least one home appliance in association with the taken images.

2. The mobile terminal according to claim 1, wherein the controller processes the operation data collected from the at least one home appliance from the time when cooking starts to the time when cooking ends, in association with the images taken through the camera from the time when cooking starts to the time when cooking ends.

3. The mobile terminal according to claim 2, wherein the time when cooking starts and the time when cooking ends are determined on the basis of a control command based on input of the user, the start time and the end time when the operation data are collected from the at least one home appliance, or implementation and end of the function of generating recipe information.

4. The mobile terminal according to claim 3, wherein the controller generates the recipe information related to cooking in association with the taken images and the collected operation data from the time when cooking starts to the time when cooking ends.

5. The mobile terminal according to claim 4, wherein the controller tags the collected operation data to the images taken through the camera, and processes the taken images and the tagged operation data to be output together with each other if there is an output request for the generated recipe information.

6. The mobile terminal according to claim 5, wherein the collected operation data include driving information of the home appliance corresponding to the collected operation data.

7. The mobile terminal according to claim 6, wherein the driving information includes detailed driving information related to cooking and operation time of the home appliance corresponding to the driving information.

8. The mobile terminal according to claim 1, wherein, if the function of generating recipe information is carried out, voice data received through a mike included in the mobile terminal are collected, and the collected voice data are processed together with the collected operation data and the taken images.

9. The mobile terminal according to claim 1, wherein the controller acquires material information through object recognition for a subject included in the taken images, and the material information is used to generate the recipe information together with the taken images and the collected operation data.

10. The mobile terminal according to claim 9, wherein the controller acquires information on a home appliance included in the taken images through object recognition, and among the collected operation data, the operation data collected from a home appliance which is not included in the taken images are not used to generate the recipe information.

11. The mobile terminal according to claim 1, wherein, if a cooking menu which is a target for generating the recipe information is selected, the controller selectively processes the operation data only collected from the home appliance used to cook the selected cooking menu.

12. The mobile terminal according to claim 1, wherein the controller analyzes material information corresponding to subjects included in a plurality of images taken from the camera, and as a result if material information included in at least one of the plurality of images is different from that included in the other images, the controller generates information on a plurality of recipes corresponding to the different kinds of material information.

13. The mobile terminal according to claim 1, wherein, if a cooking menu which is a target for generating the recipe information is selected and recipe information corresponding to the selected cooking menu is previously stored in a memory, the controller outputs information corresponding to a cooking procedure which is currently carried out on the basis of the taken images and the operation data, among the recipe information which is previously stored in the memory.

14. The mobile terminal according to claim 1, wherein, if there is a request for editing the generated recipe information after the recipe information is completely generated, graphic objects representative of the home appliance corresponding to the collected operation data and the graphic objects corresponding to the taken images are output to the display module on the basis of a flow of time, and are moved on the display module on the basis of selection of the user, and if any one of the graphic objects is moved, time information corresponding to the moved graphic object is changed to correspond to the moved distance and moved location of the graphic object.

15. The mobile terminal according to claim 14, wherein the collected operation data are grouped with the taken images at a time similar to the time when the operation data are collected, the graphic objects corresponding to the operation data and the taken images, which are included in the same group, are output to their mutual periphery, and if any one of the graphic objects is moved, the group, which includes the moved graphic object, is changed.

16. The mobile terminal according to claim 14 wherein, if a predetermined touch is given to any one of the graphic objects, the operation data or the taken image corresponding to the any one graphic object is excluded from the recipe information.

17. The mobile terminal according to claim 14, wherein the controller updates at least one of new material information, cooking information and home appliance information to the generated recipe information on the basis of selection of the user in accordance with the request for editing the generated recipe information.

18. The mobile terminal according to claim 1, wherein the controller generates an icon for receiving the output request of the generated recipe information after the recipe information is completely generated, and outputs the generated recipe information if the generated icon is selected after generation of the icon ends.

19. The mobile terminal according to claim 18, wherein an image representative of the generated icon corresponds to any one of the images included in the generated recipe information.

20. The mobile terminal according to claim 1, wherein, if there is an output request of the generated recipe information, the controller transmits driving information to the home appliance corresponding to the operation data included in the recipe information, so that the corresponding home appliance may be driven in accordance with the operation data.

21. A method of a mobile terminal for generating recipe information, the mobile terminal performing communication with at least one home appliance to generate recipe information, the method comprising:
- carrying out a function of generating recipe information on the basis of a user request;
- collecting operation data of the at least one home appliance driven in association with cooking;
- receiving a request for taking images received through a camera of the mobile terminal in a state that the function of generating recipe information is being carried out; and
- taking, by the camera, the images received through the camera in response to the request for taking images and processing the operation data collected from the at least one home appliance in association with the taken images.

* * * * *